Sept. 25, 1934.     R. L. WILCOX     1,974,729

NUT

Filed Jan. 8, 1932

Inventor

Richard Lester Wilcox,

By George E. Hall

Attorney

Patented Sept. 25, 1934

1,974,729

UNITED STATES PATENT OFFICE 1,974,729

NUT

Richard Lester Wilcox, Waterbury, Conn., assignor to The Waterbury Farrel Foundry and Machine Company, Waterbury, Conn., a corporation of Connecticut Application January 8, 1932, Serial No. 585,525

6 Claims. (Cl. 151—5)

This invention relates to a new and improved nut preferably of the castellated type.

It is the object of the invention, among other things, to provide a pressure formed nut having castles, lugs or the like, arranged thereon, substantially parallel with and in extension of some of the flat faces of the nut, with either or both the outer and the upper walls of these castles, lugs or the like, curved or beveled, with a countersunk opening at one or both ends of the hole through the nut, and the inner walls of the castles in a plane in line with the bottom of the threads in the nut or outside thereof.

To these and other ends, this invention consists in the new and improved nut having certain details of construction, as will be hereinafter described and more particularly pointed out in the claims.

Referring to the drawing, in which like numerals of reference designate like parts in the several figures.

Figure 1:
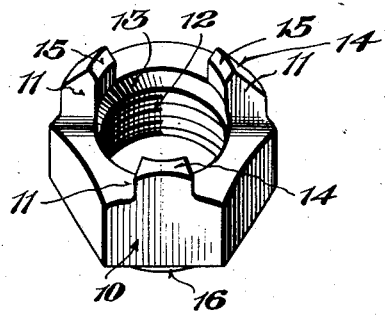
Figure 1 is a perspective view of the improved nut.
Figure 2:
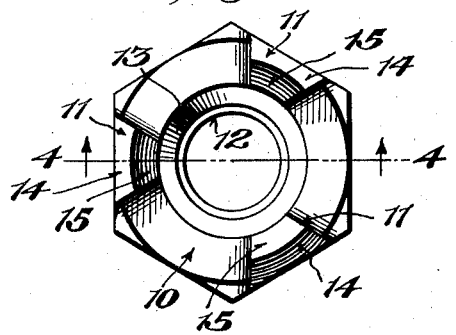
Figure 2 is an end view.
Figure 3:
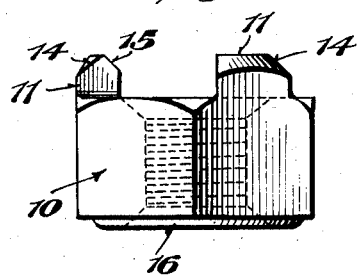
Figure 3 is a side elevation.

Heretofore castellated nuts have been produced with a plurality of castles or lugs thereon, upon one or both faces of the nut.

These castles or lugs have generally been arranged so that they are opposite the corners of the nut. The inner walls of the castles or lugs are also in line with the wall of the hole or opening through the nut so that the threading operations cut a thread upon such inner walls. This is objectionable because the sharp threaded edges of the castles or lugs are liable to be damaged or bruised owing to lack of protection and provide convenient points for waste cloth or the like to catch thereagainst.

Both the inside and outside walls of these castles or lugs are substantially parallel with each other, so that the cross section of the castle or lug is a substantially rectangular figure. These and many other objections to the present type of nut are obviated in the improved nut disclosed herein.

Referring to the drawing, in which like numerals of reference indicate like parts in the several figures; 10 is the body of the nut shown herein as hexagonal in shape, and projecting upwardly from one face of the nut, and parallel with some of the adjacent flat sides of the body are the castles or lugs 11.

The hole 12 in the nut is threaded as is usual and provided with a counterbore 13 at each end. These counterbores facilitate the threading of the nut and prevent the formation of a sharp edge at each face of the nut where the thread joins therewith.

The outer walls of the lugs 11 are substantially in line with and in extension of the adjacent flat face of the body of the nut, although not necessarily limited thereto and the inner face is substantially parallel with the outer face and in line with the largest diameter of the counter-bore 13. Hence no threads are formed thereon nor are such faces in contact with the threading tap.

Figure 4:
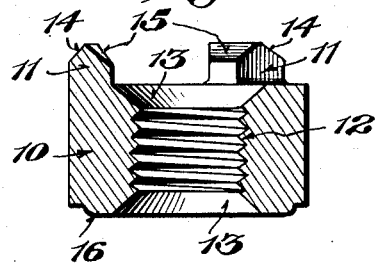
Figure 4 is a sectional view, the parts in section being taken generally upon line 4—4 of Figure 2.

The top of each castle or lug 11 has two faces respectively designated 14 and 15, which flare from a common line that may be nearer one wall of the castle than the other, as in Figure 1, or approximately intermediate the walls, as in Figure 4.

The provision of castles constructed as herein set forth requires less material than in castles of nuts of this character heretofore constructed, and thus a substantial amount of metal is saved, the weight of the nut is materially reduced, and it is produced at a lower cost. This factor of light weight is of importance when the nut is used on aeroplanes, aeroplane engines, or the like, where every ounce of weight that can be saved is of advantage. With the castles herein the open spaces between them are much more accessible for painting and consume less time for the work, as well as assuring a nut with no exposed unpainted part.

These faces 14 and 15 also give the nut a neat and pleasing appearance and present no sharp angular corners that are liable to be damaged or injured or upon which waste, rag, etc., may catch while the nut and adjacent parts, when the nut is in place, are being cleaned.

The nut illustrated has a collar 16 on one face thereof, such collar, however, is desirable but not necessary or essential and is illustrated only to show one form of the improved nut.

Heretofore nuts of this type have been made from a solid piece, the hole cut therethrough, then threaded, and one or both ends cut radially to remove portions of the solid piece whereby the castles of lugs are formed. Thus the nut is formed as the result of many successive operations. The nut disclosed herein is preferably formed entirely by pressure, except the threading operation, and largely by reason thereof is such improved nut possible of production.

Within the spirit of this invention and the scope of the appended claims, the shape of the castles or lugs may be varied from that illustrated in the drawing.

What I claim as new and desire to secure by Letters Patent, is:—

1. A pressure formed nut of the castellated type having a body with a threaded opening therethrough certain of the sides of the body having castles extending outwardly from a side face of the body, the outer portions of the inner and outer faces of the castles converging toward each other until they meet in a common line between the inner and outer faces of the castles, the other faces of the castles which confront adjacent faces of adjacent castles being curved outwardly toward and merging into said side face of the body, said side face of the body further having convex curved portions in the space between adjacent castles which merge into the said curved confronting faces of the castles, the said inner faces of the castles being spaced from the threaded opening a distance substantially approximating the thickness of the castles.

2. A pressure formed nut of the castellated type having a body with a threaded opening therethrough, certain of the sides of the body having castles extending outwardly from the side face of the body, the top of each of the castles being formed with two approximately straight faces that converge from both the inside and the outside walls of the castles to a common line between said walls.

3. A pressure formed nut of the castellated type having a body with a threaded opening therethrough, certain of the sides of the body having castles extending outwardly from the side face of the body, the top of each of the castles being formed with two approximately straight faces that converge from both the inside and the outside walls of the castles to a common line between said walls, said common line being slightly nearer one of said walls than the other of said walls.

4. A pressure formed nut of the castellated type having a body with a threaded opening therethrough, certain of the sides of the body having castles extending outwardly from the side face of the body, each of which in a cross section, coincident with a diameter of the nut, has inner and outer faces substantially parallel with each other and a top having companion faces that flare from a common line, between said inner and outer faces, toward the body of the nut.

5. A pressure formed nut of the castellated type having a body with a threaded opening therethrough, certain of the sides of the body having castles extending outwardly from the side face of the body, the inner and outer faces of the castles converging to a common line so that a cross section coincident with the diameter of the nut has substantially the form of a rectangle surmounted by a triangle.

6. A pressure formed nut of the castellated type having a body with a threaded opening therethrough, certain of the sides of the body having castles extending outwardly from the face of the body, the outer wall of each of the castles being in the same plane with and an extension of one of the sides of said body, said outer wall terminating at its upper end in a face of the castle that extends upwardly and inwardly from said outer wall to such a degree that the projection of its upper edge upon a plane lying at the upper face of the nut is between the inner and outer walls of the castles.

RICHARD LESTER WILCOX.